(12) United States Patent
Tjia

(10) Patent No.: US 7,484,031 B2
(45) Date of Patent: Jan. 27, 2009

(54) BUS CONNECTION DEVICE

(75) Inventor: Jerome Tjia, Singapore (SG)

(73) Assignee: NXP B.V., Eindhoven (NL)

( * ) Notice: Subject to any disclaimer, the term of this patent is extended or adjusted under 35 U.S.C. 154(b) by 172 days.

(21) Appl. No.: 11/628,129

(22) PCT Filed: May 24, 2005

(86) PCT No.: PCT/IB2005/051689

§ 371 (c)(1),
(2), (4) Date: Nov. 28, 2006

(87) PCT Pub. No.: WO2005/116848

PCT Pub. Date: Dec. 8, 2005

(65) Prior Publication Data

US 2007/0245059 A1    Oct. 18, 2007

(30) Foreign Application Priority Data

May 28, 2004    (EP)    ................... 04102368

(51) Int. Cl.
*G06F 13/20* (2006.01)
*G06F 13/36* (2006.01)
*G06F 13/38* (2006.01)
*G06F 13/40* (2006.01)

(52) U.S. Cl. .................. 710/313; 710/310; 710/311; 710/314

(58) Field of Classification Search .................. 710/310, 710/311, 313, 314
See application file for complete search history.

(56) References Cited

U.S. PATENT DOCUMENTS 5,784,581 A    7/1998    Hannah (Continued)

FOREIGN PATENT DOCUMENTS

WO    WO 2004/029817    4/2004

(Continued)

OTHER PUBLICATIONS

Philips Semiconductors; "AN10034_2: ISP1261 USB OTG Bridge Controller and SEOC Protocol"; Philips Semiconductors; Rev. 02.01; Mar. 30, 2004; all pages.*

(Continued)

*Primary Examiner*—Paul R Myers
*Assistant Examiner*—Ryan M Stiglic

(57) ABSTRACT

A bus connection device, in the form of a hardware dongle, can be connected to a first electronic device, in the form of a USB peripheral device, and a second electronic device can be connected thereto. The dongle can determine whether the second connected device is a USB host device or a USB peripheral device and, if the second electronic device is a USB host device, it is connected directly to the first electronic device. If the second electronic device is a USB peripheral device, the bus connection device operates to allow the first electronic device to operate as a host device. When the bus connection device is operating to allow the first electronic device to act as a USB host device, it regularly sends tokens to the first electronic device and to the second electronic device, to which the first electronic device can respond by transmitting data intended for the second electronic device, and to which the second electronic device can respond by transmitting data intended for the first electronic device.

28 Claims, 9 Drawing Sheets

U.S. PATENT DOCUMENTS

| | | | |
|---|---|---|---|
| 6,549,958 B1 | 4/2003 | Kuba | |
| 6,732,218 B2 * | 5/2004 | Overtoom et al. | 710/313 |
| 7,000,057 B1 * | 2/2006 | Novell et al. | 710/306 |
| 7,193,442 B2 * | 3/2007 | Zhu | 326/82 |
| 2003/0212841 A1 | 11/2003 | Lin | |
| 2004/0019732 A1 * | 1/2004 | Overtoom et al. | 710/313 |
| 2004/0088449 A1 * | 5/2004 | Sakaki | 710/15 |
| 2006/0045112 A1 * | 3/2006 | Laiho | 370/419 |
| 2006/0053238 A1 * | 3/2006 | Hung et al. | 710/62 |
| 2006/0059289 A1 * | 3/2006 | Ng et al. | 710/305 |
| 2006/0076977 A1 * | 4/2006 | Zhu | 326/86 |
| 2006/0106962 A1 * | 5/2006 | Woodbridge et al. | 710/106 |

FOREIGN PATENT DOCUMENTS

| | | | |
|---|---|---|---|
| WO | WO 2006095326 A2 * | 9/2006 | |

OTHER PUBLICATIONS

Philips Semiconductors; "ISP1261: USB OTG bridge Controller"; Philips Semiconductor; Aug. 2004; all pages.*

Cypress Semiconductor Corporation; "CY7C67200: EZtm Programmable USB On-The-Go Host/Peripheral Controller"; Cypress Semiconductor Corporation; Revision E; Sep. 16, 2003; all pages.*

Philips Semiconductors; "ISP1362: Single-chip Universal Serial Bus On-The-Go controller"; Philips Semiconductors; Rev. 02; Feb. 19, 2003; all pages.*

TransDimension Inc.; "TD242LP: USB On-The-Go Low Power, Two Port, Single Chip Host/Peripheral Controller"; TransDimension Inc.; Rev. 1.1; Mar. 22, 2004; all pages.*

"On-The-Go Supplement to the USB 2.0 Specification"; Revision 1.0; Dec. 18, 2001, p. 3.*

* cited by examiner

BUS CONNECTION DEVICE

This invention relates to a bus connection device, and in particular to a device which can be used with electronic devices in a bus communication system, to allow the equipment to act as a host within the system.

The Universal Serial Bus (USB) communication system is becoming very widespread. In a USB system, it is possible to interconnect many items of electronic equipment, such as personal computers, scanners, mobile phones, printers, etc. In any system, one item of equipment is always designated as the USB host, which controls connections with all of the other items, which are designated as USB devices, or peripheral devices. Personal computers are typically provided with the hardware and software required to allow them to act as USB hosts, but other items are typically not provided with the required hardware and software, and thus can only act as USB devices.

There are however situations in which it would be useful for an item of equipment to be able to act as a USB host, without requiring major modification of the equipment. The document WO2004/029817 describes a device, in the form of a hardware dongle, which can be connected to the USB port of a device, enabling it to act as a host in the USB system. In conjunction with suitable software in the USB device, the hardware dongle retrieves and stores data which, for example is being passed from the device, to which the dongle is connected and which is acting as a host in the system, to a further device.

This means that the hardware dongle must be able to store relatively large quantities of data, for example such as the amount of data transferred in one millisecond, with the result that the dongle must contain a relatively large number of components.

According to a first aspect of the present invention, there is provided a bus connection device, having first and second connection ports, and which can be controlled to send tokens to respective devices connected to both the first and second ports, and which is adapted, on receipt of data transmitted from one of said devices, to pass said data through to the other of said devices.

This has the advantage that the device does not require a large buffer memory.

For a better understanding of the present invention, and to show how it may be put into effect, reference will now be made, by way of example, to the accompanying drawings, in which.

Figure 1:
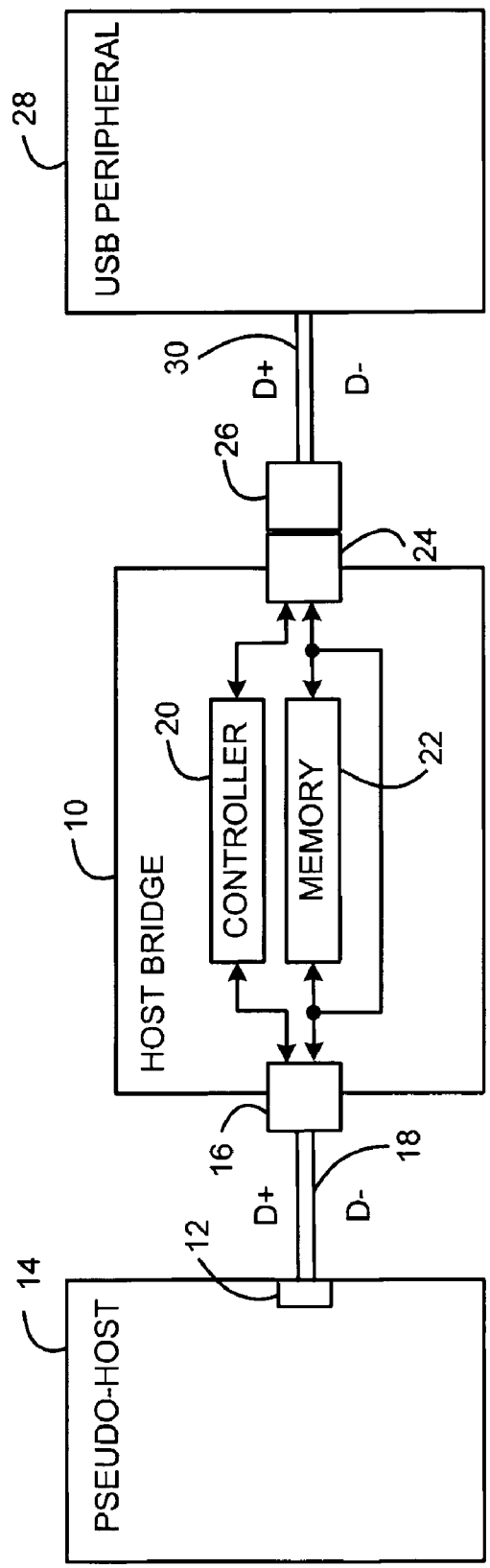
FIG. 1 is a block schematic diagram, showing a bus communications system utilizing a device in accordance with a first aspect of the present invention.

FIG. 1 shows a system which includes a device in accordance with a first aspect of the invention. The device 10 takes the form of a hardware dongle, which can be connected to a USB port 12 in a USB device 14.

In a system which is connected by means of USB bus connections, one piece of equipment is designated as the host, while other pieces of equipment are designated as peripheral devices. One of the pieces of equipment must be enabled to act as a host, in order to control communications with the other devices. The ability of a piece of equipment to act as a USB host, or USB peripheral device, is dependent on it having the appropriate functionality.

In this case, the equipment 14 is a USB device, that is, it does not have the functionality to allow it to act as a USB host. However, the purpose of the hardware dongle 10 is to allow the device 14 to act as a host, and thus the device 14 is also described herein as a pseudo-host.

The device 10, which is also referred to herein as a host bridge, is connected by a port 16 to the USB port 12 of the pseudo-host 14, by means of conventional USB D+/D− lines 18.

The host bridge device 10 includes a controller 20, and memory 22, the functions of which will be described in more detail below. The host bridge device 10 also has a USB port 24, in the form of a conventional mini-AB socket, which can receive a conventional USB plug.

The host bridge device 10 is able to determine, from the type of plug which is plugged into the socket 24, what type of device is connected to it.

That is, if a mini-B plug is plugged into the socket 24, the host bridge device 10 is able to determine that the device which is plugged into it is a piece of equipment which is enabled to operate as a USB host. For example, this may be a personal computer (PC) or something similar.

On the other hand, in this illustrated embodiment of the invention, the plug 26, which is plugged into the socket 24, is a mini-A plug, which indicates to the host bridge device 10 that the device 28 is a USB peripheral device, that is, it is not enabled to act as a USB host. As before, the connection between the plug 26 and the USB peripheral device 28 is by means of conventional USB D+/D− lines 30, which are well known to the person skilled in the art, and will not be described further herein.

In the case where the device plugged into the socket 24 is a USB host, the host bridge 10 acts as a transparent hub. That is, data is passed directly from the socket 24 to the port 16, allowing the peripheral device 14 to act in exactly the same way as if the USB host and the device 14 were directly connected together.

This contrasts with other known host bridge devices, which are provided with a device engine, which means that a connected USB host cannot interact directly with the device controller in the USB device, but only with the device controller in the host bridge device.

In the case where the device 28 plugged into the socket 24 is a USB peripheral, the host bridge 10 acts to allow the pseudo-host device 14 to act as if it were a conventional USB host device. This operation will now be described in more detail, with reference to the remaining figures.

In this mode of operation, the host bridge 10 acts under the control of its controller 20, but also receives control information from the pseudo-host device 14 over the D+/D− lines 18. Specifically, a scheduling method is defined. As part of this schedule, regular time slots on the D+/D− lines 18 are reserved for the pseudo-host 14 to send control information to the controller 20 of the host bridge 10. In addition, a form of round robin scheduling is defined between the different connected devices. That is, although FIG. 1 shows only a single USB peripheral 28, connected to the host bridge 10, it will be appreciated that, as in conventional in USB bus systems, multiple peripheral devices can be connected to the host.

In a conventional USB bus system, data is transferred in response to tokens, which are conventionally sent from a host to the connected devices.

In this embodiment of the present invention, the host bridge 10 sends tokens both to the pseudo-host 14, and to the peripheral 28. The operation of the system, in accordance with the present invention, will therefore now be described in further detail.

As is well known, USB transactions take four forms. Bulk and Interrupt transactions are used for transferring data in cases where it is important that all of the data be transferred, and thus each transferred data packet is acknowledged by the receiving device.

Isochronous transactions are used when it is more important that the data be transferred quickly, and in that case there is no acknowledgement sent.

Control transactions are used in order to set up the system as desired.

Figure 2:
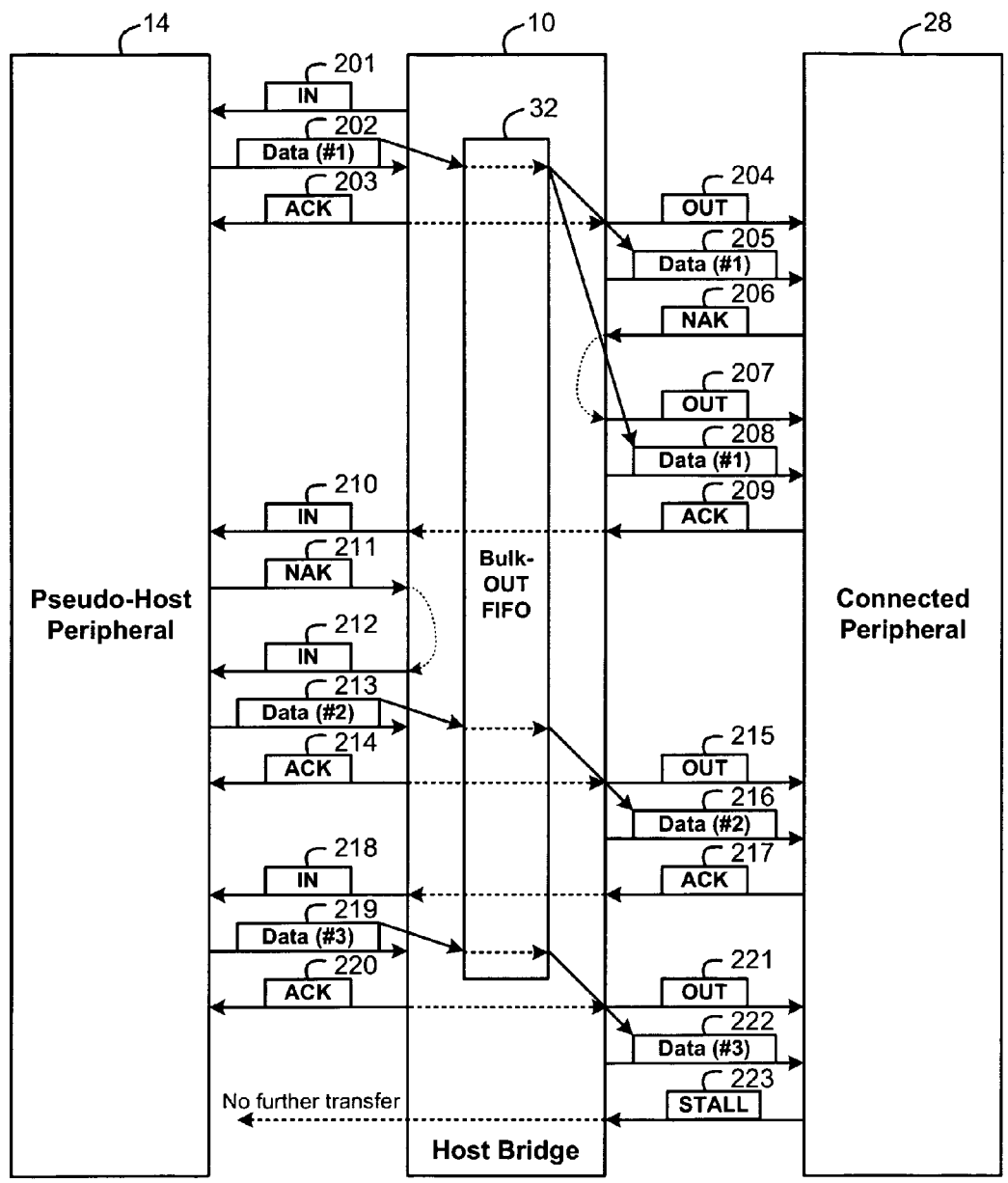
FIGS. 2-9 show the time histories of signals passing between the components in the bus communication system of FIG. 1.

FIG. 2 shows a process which is performed when a Bulk transaction is to be carried out, in order to transfer data from the pseudo-host 14 through the host bridge 10 to the connected peripheral 28.

As mentioned above, a schedule is defined, which means that, at regular intervals, the host bridge 10 sends IN tokens to the pseudo-host 14.

In response to one such token 201, the pseudo-host 14 returns a first data packet 202. This first data packet is stored in a first-in, first-out memory (FIFO) 32, which forms part of the memory 22 of the host bridge 10.

The host bridge 10 then sends an acknowledgement (ACK) 203 to the pseudo-host 14, and at the same time sends an OUT token 204 to the connected peripheral 28, in order to indicate that data will follow. The buffered first data packet is then retrieved from the FIFO 32, and sent, at 205, to the connected peripheral 28.

In this illustrated situation, the connected peripheral 28 is not ready to receive transferred data 205 and so it sends a non-acknowledgement (NAK) 206 back to the host bridge 10.

The host bridge 10 responds to the NAK 206 by sending a further OUT token 207, and retransmitting the first data packet at 208.

In this illustrated case, the first data packet 208 is correctly received by the connected peripheral 28, which therefore sends an ACK 209.

When the host bridge 10 receives the acknowledgement that the first data packet has been correctly received by the connected peripheral 28, it sends a further IN token 210 to the pseudo-host 14. In this illustrated situation, the pseudo-host 14 is not ready to send data, and so it sends a NAK message 211 in reply. The host bridge 10 responds to this by resending an IN token 212.

In this illustrated case, the pseudo-host 14 is then ready to send data, and so it responds by sending the second data packet 213.

As before, this second data packet 213 is stored in the FIFO 32, and the host bridge 10 sends an ACK message 214 to the pseudo-host 14. At the same time, it sends an OUT token 215 to the connected peripheral 28, indicating that a further data packet will follow. The data packet 216 is then sent to the connected peripheral 28, which in this case is able to correctly receive the data packet, and sends an ACK message 217.

Again, as before, the host bridge responds to this by sending a further IN token 218 to the pseudo-host 14, inviting it to send further data. The pseudo-host 14 responds by sending a third data packet 219. As before, therefore, the third data packet 219 is stored in the FIFO 32, while an ACK message 220 is sent to the pseudo-host 14 and, at the same time, an OUT token 221 is sent to the connected peripheral 28. Following that, the third data packet 222 is sent to the connected peripheral.

In this illustrated case, a stall response 223 is sent from the connected peripheral 28 to the host bridge 10, although a STALL response can be sent also from the pseudo-host 14. In either case, further scheduling of that transfer will stop, until it has been re-enabled.

Thus, as can be seen from this description, the FIFO 32 is only required to buffer one data packet at a time, although double buffering or a ring FIFO could alternatively be used, and this may improve the system performance in some respects. In either case, however, the requirement for the host bridge 10 to store data is greatly reduced.

Figure 3:
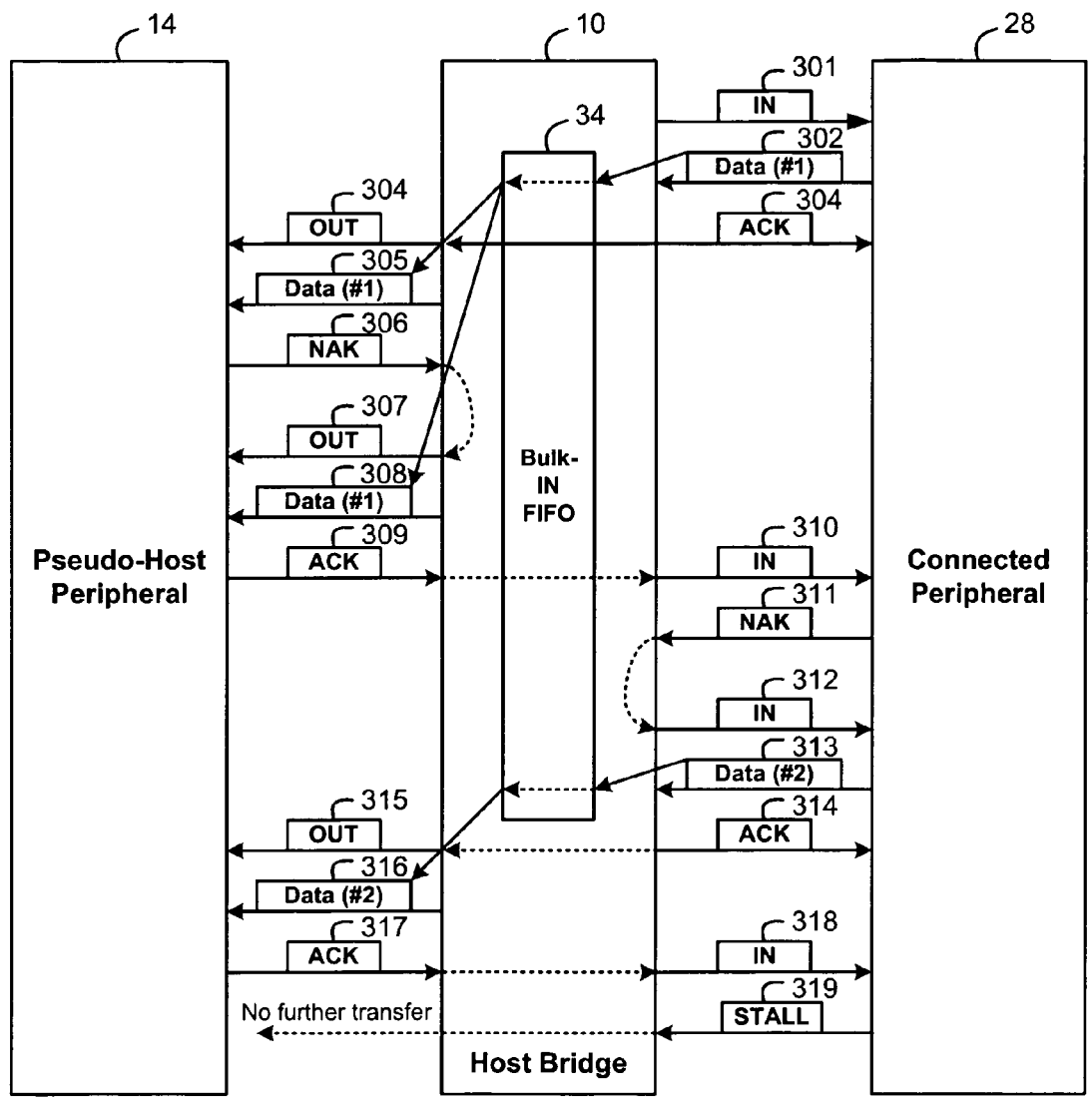

FIG. 3 shows the process performed in the case of Bulk transaction, in which data is transferred from the connected peripheral device 28 through the host bridge 10 to the pseudo-host 14.

This process begins with one of the regularly scheduled IN tokens 301, being sent from the host bridge 10 to the peripheral 28. Since the peripheral 28 has data to send, it sends a first data packet 302, which is stored in a FIFO 34, which again forms part of the memory 22 of the host bridge 10. The FIFO 34, and the other FIFOs mentioned herein, may be part of the same physical device as the FIFO 32 shown in FIG. 2, or may be separate.

The host bridge 10 then sends an acknowledgement ACK 303 to the connected peripheral 28, and at the same time sends an OUT token 304 to the pseudo-host 14, indicating that it has data to send.

The host bridge 10 then sends the first data packet 305 to the pseudo-host 14. In this illustrated case, the pseudo-host 14 is not ready to receive the first data packet 305, and so it sends a non-acknowledgement (NAK) 306 to the host bridge 10. The host bridge 10 responds by resending the OUT token 307, and thereafter resending the first data packet 308.

In this case, the first data packet 308 is correctly received, and so the pseudo-host 14 sends an ACK 309 to the host bridge 10. The host bridge 10 then sends a further IN token 310 to the connected peripheral 28, inviting it to send further data. In this case, the connected peripheral 28 is not ready to receive data, and so it sends a NAK 311. The host bridge 10 responds by resending the IN token 312, and in this case the connected peripheral 28 is ready to receive data, and so it responds with a second data packet 313.

Again, the data packet is stored in the FIFO 34, and the host bridge 10 sends an ACK 314 to the connected peripheral 28, and at the same time sends an OUT token 315 to the pseudo-host 14. This is followed by the second data packet 316, having been retrieved from the FIFO 34. The second data packet 316 is correctly received by the pseudo-host 14, which sends an ACK 317 to the host bridge 10.

The host bridge 10 then sends a further IN token 318 to the connected peripheral 28.

In this case, the connected peripheral 28 sends a STALL response 319, which acts as described above with reference to FIG. 2, and there is no further data transfer.

Again, therefore, the requirement for the host bridge 10 to buffer the transferred data is greatly reduced.

FIGS. 2 and 3 show the processes which are used for Bulk transactions. In this illustrated embodiment of the present invention, Interrupt transactions follow the same protocol, with the difference that the IN tokens sent by the host bridge 10 to the pseudo-host 14 and the connected peripheral 28 are scheduled differently.

Figure 4:
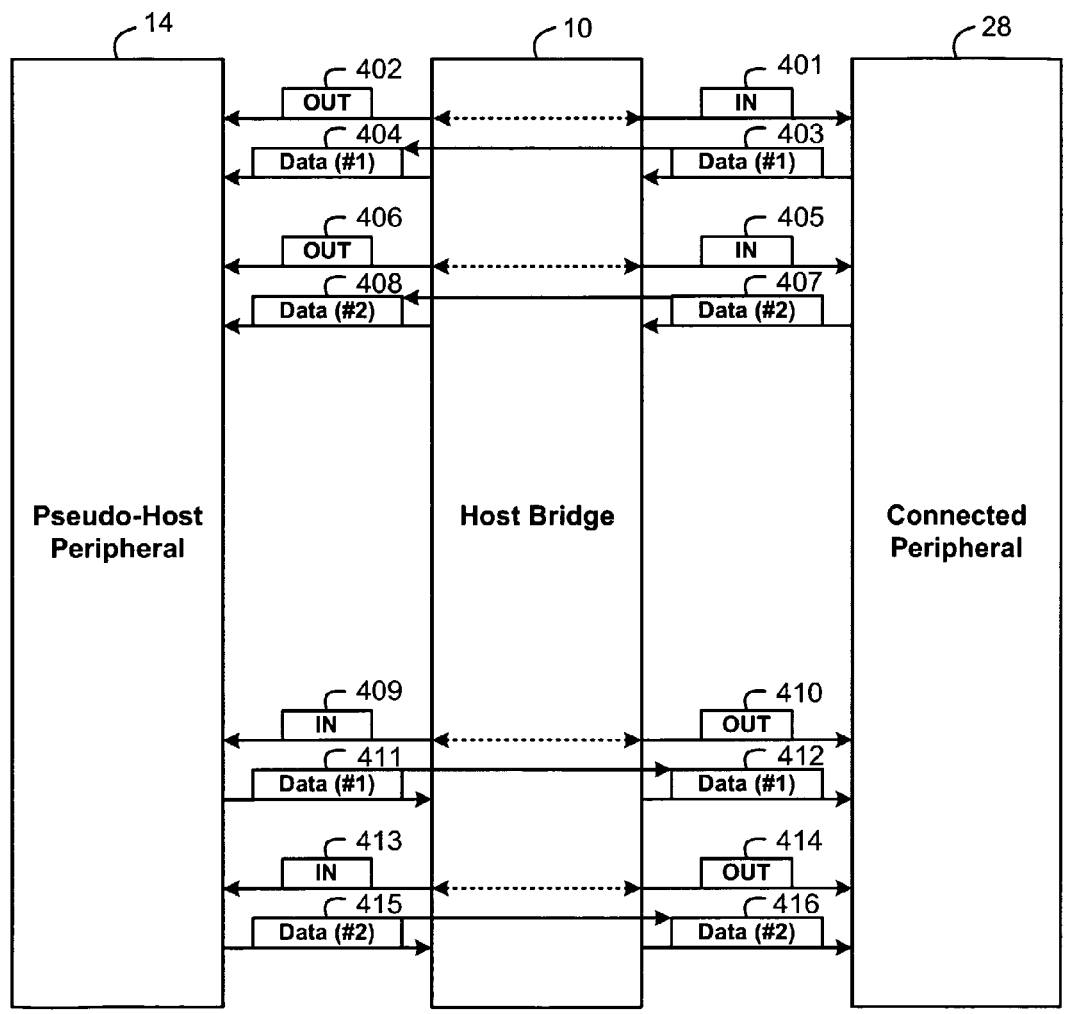

FIG. 4 shows a process for performing an Isochronous transaction. In the first illustrated Isochronous transaction, data is transferred from the connected peripheral 28 to the pseudo-host 14.

Each endpoint in a connected peripheral 28 is partially defined in a USB system by means of a 'type', which indicates whether it is used for Bulk or Isochronous transactions. Thus, some types of device are more suited for data transfers in which it is essential that all of the data be transferred, and other types of device are more suited to transfers in which the data is transferred quickly.

Thus, the process shown in FIG. 4 begins when the host bridge 10 sends an IN token 401 to the connected peripheral 28. Since it is known that the connected peripheral 28 is of a type which uses Isochronous transactions, the host bridge 10 also sends, at the same time, an OUT token 402 to the pseudo-host 14, to indicate that it may be about to receive data.

In this illustrated situation, the connected peripheral 28 has data to send, and so it returns a first data packet 403 to the host bridge 10. In this case, the received data packet 403 is routed straight through the host bridge 10, without any FIFO buffering, and is passed directly through the pseudo host 14 as a data packet 404. The result is that there is a minimal delay, which for example may be a gate delay of only a few nanoseconds, in transferring the data through the host bridge 10. Since this is an Isochronous transaction, there is no acknowledgement message, and the process continues with the host bridge 10 sending a further IN token 405 to the connected peripheral 28, and a further OUT token 406 to the pseudo-host 14. Since the connected peripheral 28 has more data to send, it returns a second data packet 407 to the host bridge 10, which again passes this directly through, without buffering, to the pseudo-host 14 as the data packet 408.

The lower part of FIG. 4 shows the converse process, in which data is transferred in an Isochronous transaction from the pseudo-host 14 to the connected peripheral 28.

Again, the process begins with a regularly scheduled IN token 409, being sent from the host bridge 10 to the pseudo-host 14 and, at the same time, an OUT token 410 being sent to the connected peripheral 28, which is known to be of a type which takes part in Isochronous transactions. Since the pseudo-host 14 has data to send to that particular connected peripheral, it returns a first data packet 411, which is passed directly through the host bridge 10 as a data packet 412 to the connected peripheral 28. As described above, the data packet is passed directly through the host bridge 10, with no FIFO buffering, and therefore with a minimal delay.

Again, there is no acknowledgement, and the process continues with a further IN token 413 being sent from the host bridge 10 to the pseudo-host 14, and a further OUT token 414 being sent from the host bridge 10 to the connected peripheral 28.

The pseudo-host 14 has further data to send, and so it returns a second data packet 415, which again is passed directly through the host bridge 10 without FIFO buffering, and passed to the connected peripheral 28 as the data packet 416.

As before, this process can continue for as long as the pseudo-host 14 has data to send to the connected peripheral 28.

Figure 5:
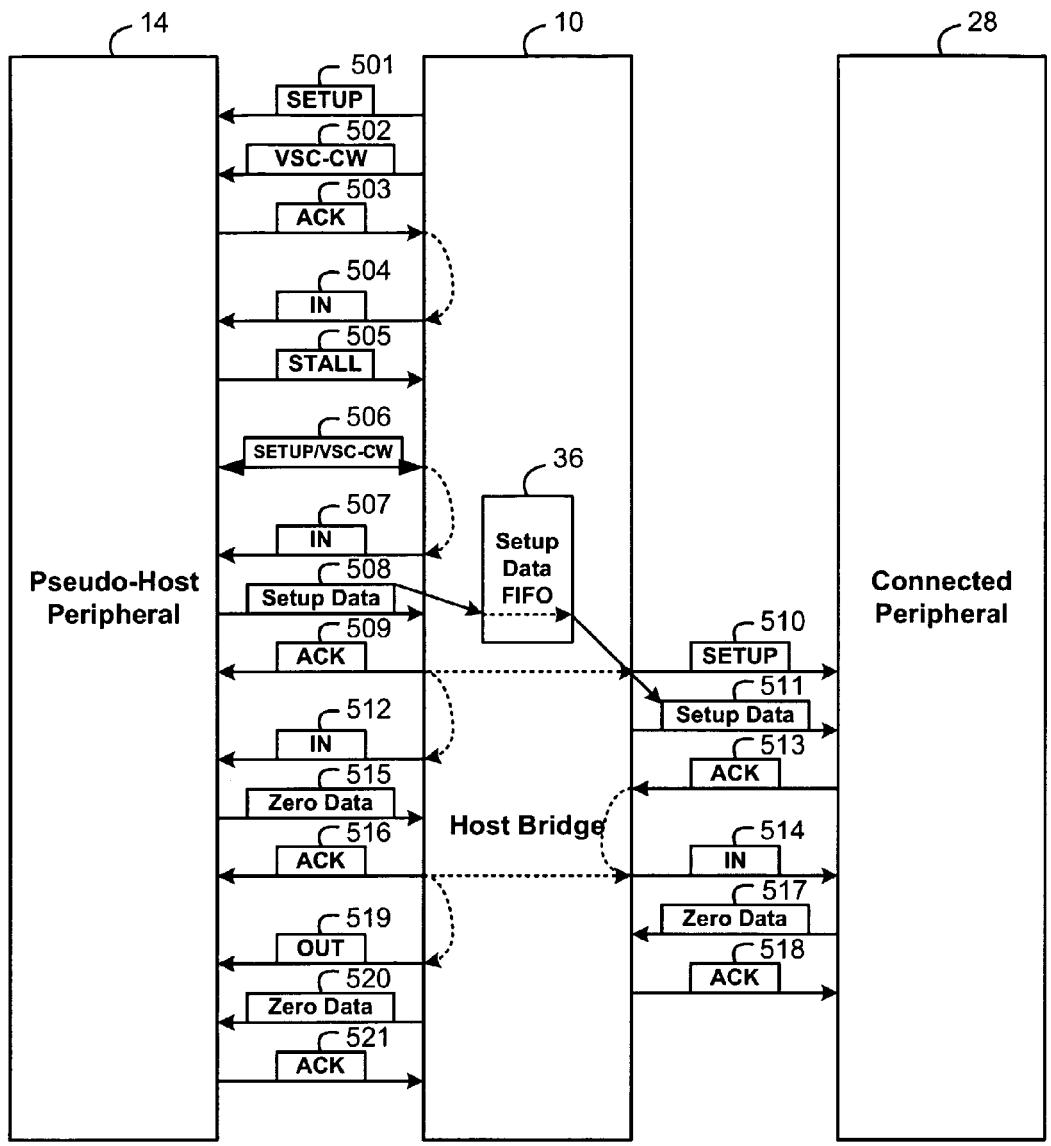

FIG. 5 shows a process for performing a 'No-Data Control' transfer from the pseudo-host 14 to the connected peripheral 28. This is equivalent to a Control Write with no data stage.

The process begins with a SETUP message 501 sent from the host bridge 10 to the pseudo-host 14, and this is followed by a Vendor Specific Command for Control Write (VSC-CW) 502.

The pseudo-host 14 sends an ACK 503 to indicate that it has correctly received the VSC-CW 502, and the host bridge 10 responds with an IN token 504.

In this illustrated case, the pseudo-host 14 sends a STALL response, indicating that it does not wish to execute a controlled transfer. This terminates the process for the time being. A NAK response at this point indicates that, although the pseudo-host 14 wishes to execute the Control Write transfer, it is not ready (that is, it is busy) at this time.

In accordance with the predetermined schedule, a further opportunity will arise for the control transfer, and the SETUP, VSC-CW and ACK messages, as described above, are together indicated by transfer 506. Again, this stage is followed by an IN token 507 sent from the host bridge 10 to the pseudo-host 14 and, in this case, the pseudo-host 14 wishes to execute a control transfer, and returns Setup Data 508. On receipt by the host bridge 10, the Setup Data packet is stored in a FIFO 36. The host bridge 10 sends an ACK message 509 to the pseudo-host 14, and at the same time sends a SETUP message 510 to the connected peripheral 28. The host bridge 10 follows this with the Setup Data packet 511, retrieved from the FIFO 36.

Having acknowledged the Setup Data 508, the host bridge 10 sends a further IN token 512 to the pseudo-host 14, inviting it to transfer further data.

Having received the Setup Data 511, the connected peripheral 28 sends an ACK message 513 back to the host bridge 10, and the host bridge 10 responds to this by sending an IN token 514 to the connected peripheral 28.

In this case, the pseudo-host 14 has no further data to send, and so it sends a Zero Data message 515 to the host bridge 10, and the host bridge 10 sends an ACK message 516 in return. In addition, in this embodiment, the connected peripheral has no data to transfer, and so it sends a Zero data message 517. The host bridge 10 acknowledges this with an ACK message 518, and it also sends an OUT token 519 to the pseudo-host 14, to indicate that it has a message for it. In this case, it simply passes on the Zero Data message 520, received from the connected peripheral 28. The pseudo-host responds by sending an ACK message 521.

Thus, it can be seen that the Zero Data response 515 signifies the end of the control transfer, and the host bridge 10 proceeds to conclude the control transfer on both sides.

Figure 6:
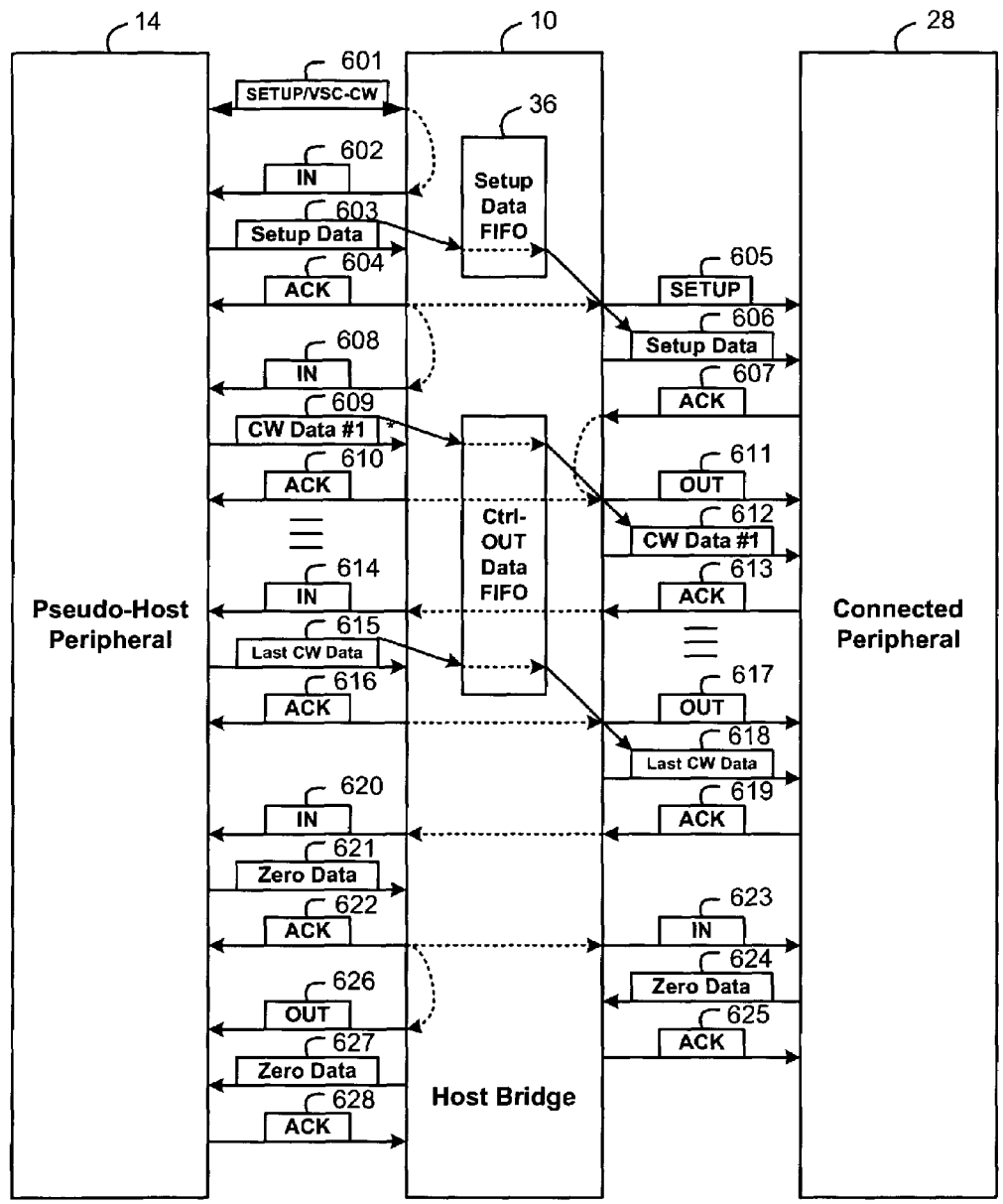

FIG. 6 shows a process for performing a Control Write from the pseudo-host 14 to the connected peripheral 28.

As described with reference to FIG. 5, the process begins with SET-UP VSC-CW messages being sent from the host bridge 10 to the pseudo-host 14, and an ACK being sent from the pseudo-host 14 to the host bridge 10. These messages are shown together in FIG. 6 as a single block 601. As before, this is followed by an IN token 602, sent from the host bridge 10 to the pseudo-host 14. As the pseudo-host wishes to execute a control transfer, it returns Setup Data 603. As before, on receipt by the host bridge 10, the Setup Data is stored in the Setup Data FIFO 36, and the host bridge 10 sends an ACK message 604 to the pseudo-host 14, and at the same time sends a SETUP message 605 to the connected peripheral 28. The host bridge 10 follows this with the Setup Data 606, retrieved from the FIFO 36. The connected peripheral 28 responds to the Setup Data 606 with an ACK 607.

Having acknowledged the Setup Data 603, the host bridge 10 sends a further IN token 608 to the pseudo-host 14, inviting it to transfer further data.

In this case, unlike the situation shown in FIG. 5, the pseudo-host 14 does not respond with a Zero Data message, but instead responds to indicate that it wishes to carry out a Control Write transfer with a data stage. Specifically, the pseudo-host 14 responds with a first CW Data packet 609. This is acknowledged by ACK message 610 by the host bridge 10, and the data packet is stored in a Data FIFO 38, which is separate from the Setup Data FIFO 36.

The host bridge 10 also sends an OUT message 611 to the connector peripheral 28, indicating that it is about to send data, and then it sends the first CW Data packet 612 from the FIFO 38. The connected peripheral 28 acknowledges receipt of this data packet by means of a ACK message 613.

The host bridge 10 sends further IN tokens to the pseudo-host 14 to allow it to send further data, and one such IN token 614 is shown in FIG. 6, to which the pseudo-host 14 responds by sending the last CW Data packet 615. As described above, the host bridge 10 sends an ACK message 616 to acknowledge this data, which it also stores in the FIFO 38. The host bridge 10 also sends an OUT token 617 to the connected peripheral 28, and then sends the last CW Data packet 618 to the connected peripheral 28. The connected peripheral 28 responds to this by means of an ACK message 619.

The host bridge 10 then sends a further IN token 620 to the pseudo-host 14, which responds with a Zero Data message 621, and the host bridge 10 acknowledges that by means of an ACK message 622. The host bridge 10 also sends an IN token 623 to the connected peripheral 28, to give it an opportunity to send data, but the connected peripheral has no data to transfer, and so it sends a Zero Data message 624. The host bridge 10 acknowledges this with an ACK message 625, and it also sends an OUT token 626 to the pseudo-host 14, to indicate that it has a message for it. In this case, it simply passes on the Zero Data message 627 received from the connected peripheral 28. The pseudo-host 14 responds by sending an ACK message 628.

Figure 7:
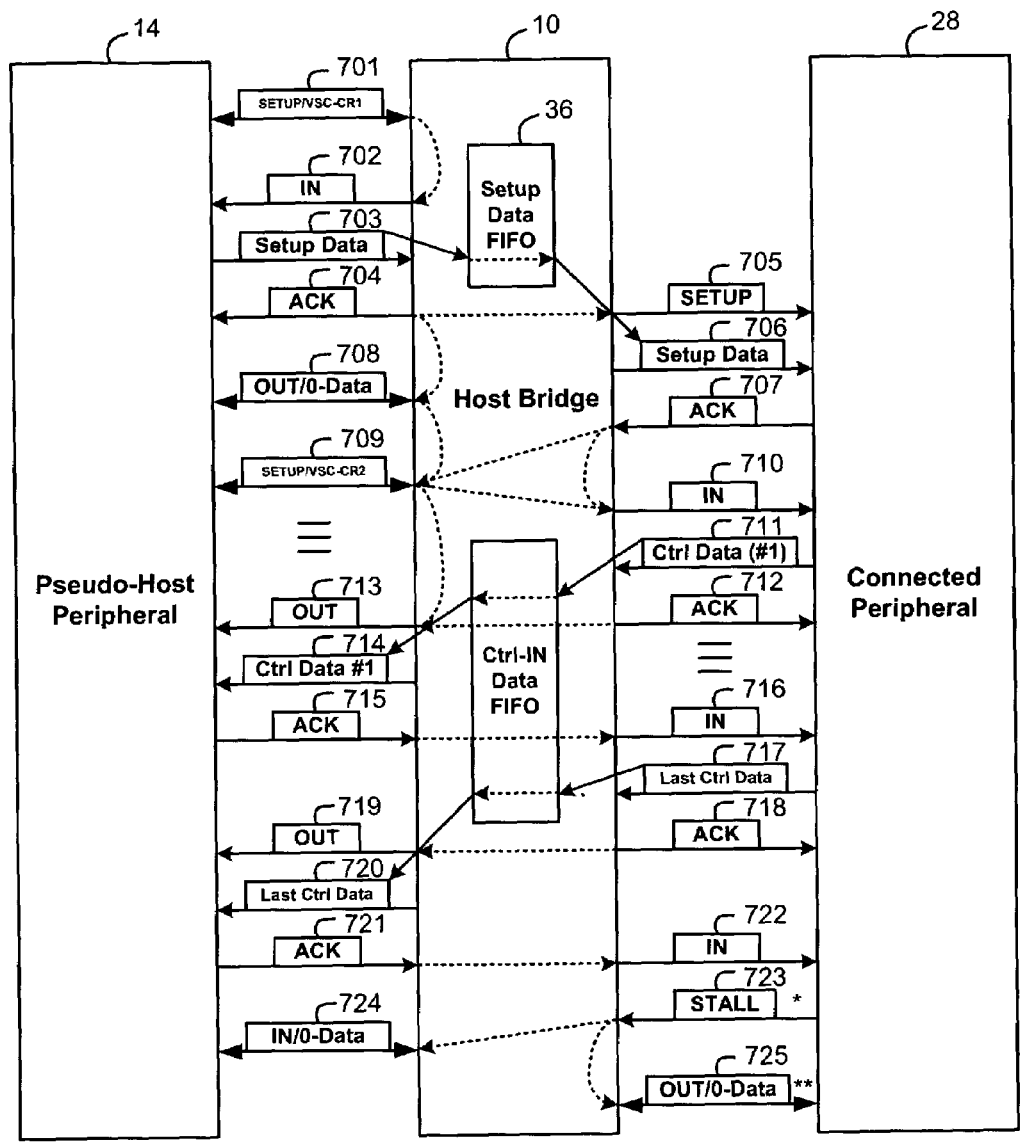

FIG. 7 shows a process for performing a 'Control Read' from the connected peripheral device 28 to the pseudo-host 14. Firstly, a setup procedure is performed, as described previously, with the exception that the message sent is a Vendor Specific Command for Control Read (VSC-CR), as shown at block 701. There are two forms of the VSC-CR message, namely a VSC-CR1 message used during the setup stage, and a VSC-CR2 message sent during the data stage.

Next, the host bridge 10 sends an IN token 702 to the pseudo host 14, which responds with the Setup DATA 703. As before, this is acknowledged with an ACK message 704, the Setup Data is stored in a FIFO 36, and the host bridge 10 sends a SETUP message 705 to the connected peripheral 28, which is followed by the Setup Data 706. The connected peripheral 28 acknowledges this by means of an ACK message 707.

The host bridge 10 then sends an OUT/0-Data message 708 to the pseudo-host 14, and a data setup stage 709 is performed. The host bridge 10 then sends IN token 710 to the connected peripheral 28, which replies with the first Control Data packet 711. This is acknowledged by an ACK message 712, and the data is stored in an appropriate FIFO 40 in the host bridge 10.

The host bridge 10 then sends an OUT token 713 to the pseudo-host 14, and follows this with the retrieved first Control Data Packet 714. The pseudo-host 14 acknowledges this with an ACK message 715, and the host bridge 10 sends a further IN token 716 to the connected peripheral 28. In this case, the connected peripheral 28 responds to the IN token 716 with the last Control Data packet 717. This is acknowledged by the host bridge 10 by the ACK message 718, and the data is stored in FIFO 40. The host bridge 10 also sends an OUT token 719 to the pseudo-host 14, and then sends the last Control Data packet 720. The pseudo-host 14 acknowledges this by means of an ACK message 721, and the host bridge 10 sends a further IN token 722 to the connected peripheral 28. That is, the host bridge 10 does not need to know the number of Control Data packets which it will receive, or the number of IN tokens it should issue. Rather, it continues to issue IN tokens until, as here, the connected peripheral 28 responds with a STALL message 723. The process may be similarly terminated by means of a Zero Data response from the connected peripheral 28.

In response to the STALL message 723, the host bridge 10 and pseudo-host 14 perform a Status stage 724. FIG. 7 also shows a Status stage 725 performed between the host bridge 10 and the connected peripheral 28, although this is required only if the previous transaction is an IN/0-Data.

Thus, as described above, the pseudo-host 14 can perform control transactions with the connected peripheral 28. In addition, the pseudo-host 14 can perform control transactions with the host bridge 10, as will now be described in more detail.

Figure 8:
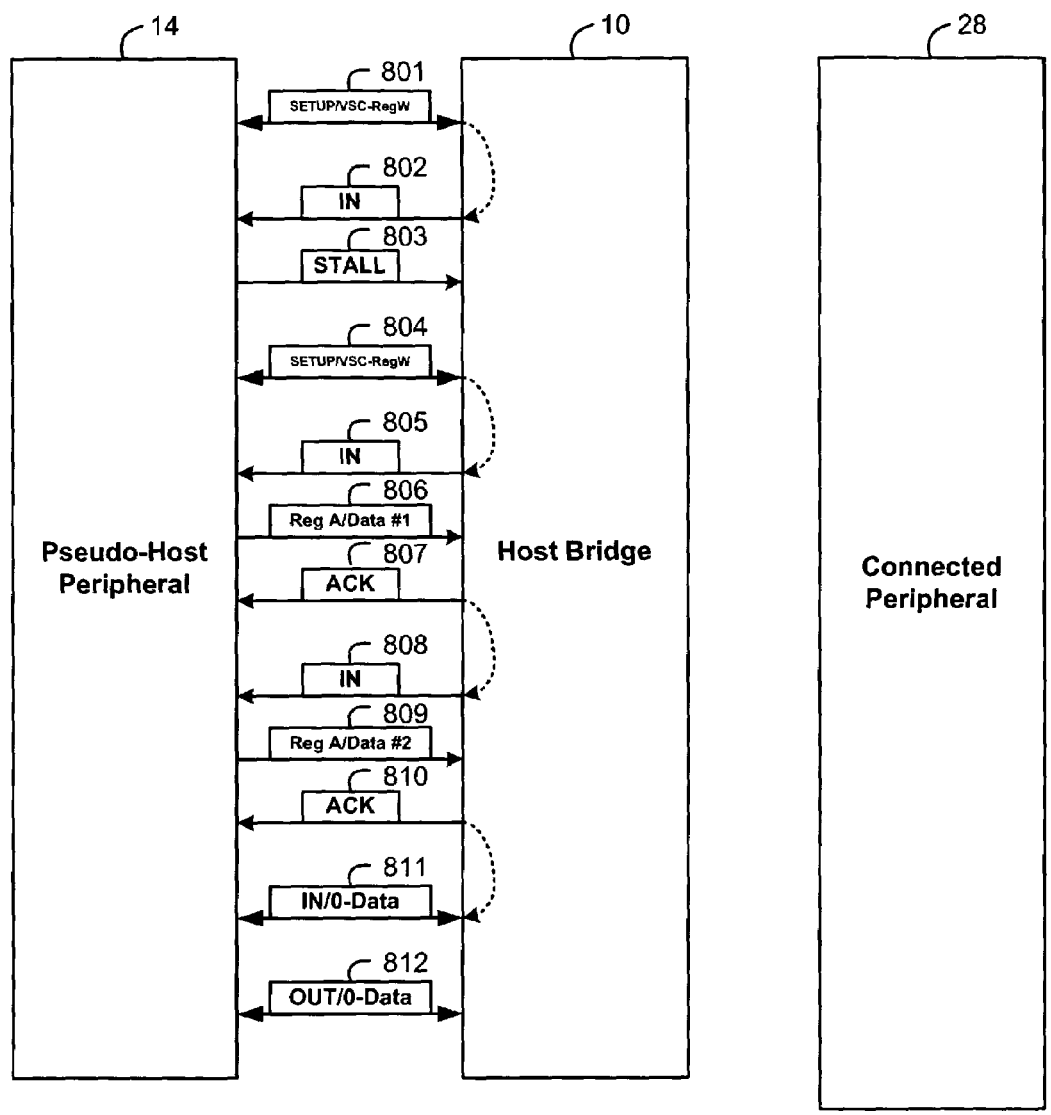

Thus, FIG. 8 shows a procedure for performing a Control-Register Write process to the host bridge. Block 801 shows the setup procedure, including the Vendor Specific Command for Register Write (CSC-RegW), which uses the same protocol as described with reference to FIG. 5. In this case, the host bridge 10 then sends an IN token 802 to the pseudo-host 14, and, in this case, the pseudo-host 14 does not wish to execute a Register Write Control transfer, and so it responds with a STALL response 803. A NAK response at this point indicates that, although the pseudo-host 14 wishes to execute the Register Write control transfer, it is not ready (that is, it is busy) at this time.

Therefore, at a later time, the setup procedure is repeated 804, and the host bridge 10 sends a further IN token 805. At this time, the pseudo-host wishes to execute the transfer, and it responds with a first data packet 806. This is acknowledged with an ACK message 807 by the host bridge 10, which then sends a further IN token 808, to which the pseudo-host 14 replies with a second data packet 809. Again, this is acknowledged with an ACK message 810, and the process proceeds until stages 811, 812, which are performed when there is no further data to be transferred.

Figure 9:
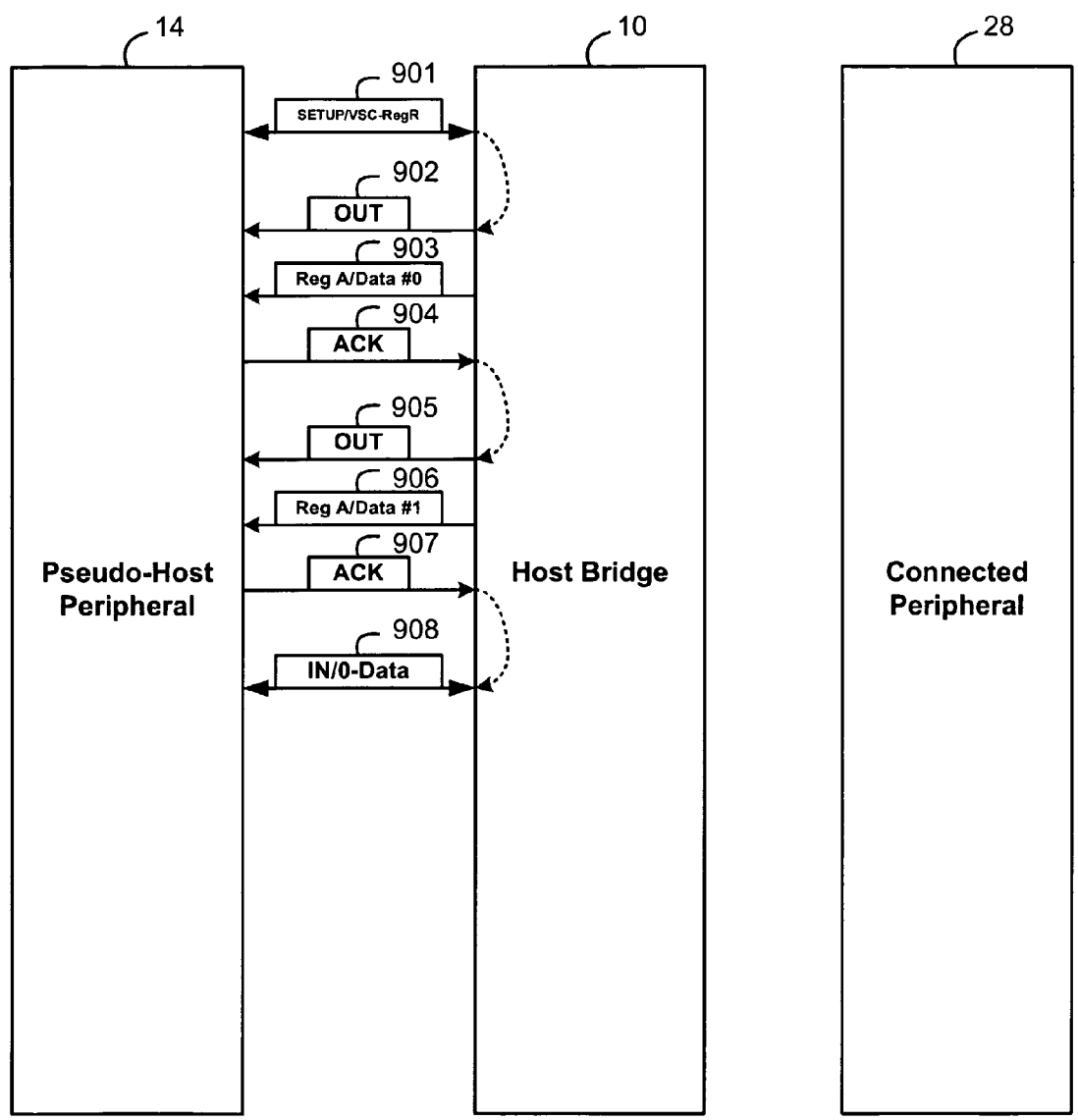

FIG. 9 shows a procedure for performing a Control-Register Read from the pseudo-host 14 to the host bridge 10. Again, a similar setup procedure 901 is used, incorporating the Vendor Specific Command Register Read (VSC-RegR). In this case, the host bridge 10 sends an OUT token 902 to the pseudo-host 14, and follows this by sending the first data packet 903. The pseudo-host 14 acknowledges this with an ACK message 904. A further OUT token 905 and second data packet 906 are then sent from the host bridge 10 to the pseudo-host 14, which acknowledges these with an ACK message 907. Again, this process continues until stage 908, in which it is indicated that there is no further data to be transferred.

There is thus disclosed a device which can be connected to a USB device, and which allows the USB device to act as a USB host, when a further USB peripheral device is connected to it.

The invention claimed is:

1. A bus connection device, for connection to a first electronic device, and having means by which a second electronic device can be connected thereto,
    wherein the bus connection device determines whether the second connected device is a host device or a peripheral device and, if the second electronic device is a host device, it is connected directly to the first electronic device whereas, if the second electronic device is a peripheral device, the bus connection device operates to allow the first electronic device to operate as a host device,
    wherein, when the bus connection device is operating to allow the first electronic device to act as a host device, said bus connection device regularly sends tokens to the first electronic device and to the second electronic device, to which the first electronic device can respond by transmitting data intended for the second electronic device, and to which the second electronic device can respond by transmitting data intended for the first electronic device.

2. A bus connection device as claimed in claim 1, wherein the bus connection device determines whether the second connected device is a USB host device or a USB peripheral device and, if the second electronic device is a USB host device, it is connected directly to the first electronic device whereas, if the second electronic device is a USB peripheral device, the bus connection device operates to allow the first electronic device to operate as a USB host device.

3. A bus connection device as claimed in claim 2, wherein the means by which the second electronic device can be connected thereto comprises a USB mini-AB socket, and wherein the bus connection device determines whether the second connected device is a USB host device or a USB peripheral device on the basis of a type of plug inserted into the mini-AB socket.

4. A bus connection device as claimed in claim 2, wherein both the USB host device and the USB peripheral device initiate Bulk, Interrupt, and Isochronous transactions.

5. A bus connection device as claimed in claim 2, wherein, if the second electronic device is a USB peripheral device, the bus connection device determines if an endpoint in the second electronic device is used for Bulk or Isochronous transactions.

6. A bus connection device as claimed in claim 5, wherein, if the second electronic device is a USB peripheral device, and the endpoint in the second electronic device is used for Isochronous transactions, then, when said bus connection device sends tokens to the first electronic device or to the second electronic device, to which said first electronic device or said second electronic device can respond by transmitting data, said bus connection device also sends tokens to the second electronic device or to the first electronic device, to indicate to said second electronic device or said first electronic device that it may receive transmitted data.

7. A bus connection device as claimed in claim 5, wherein said bus connection device, if it is determined that said second electronic device is a USB peripheral device and an endpoint in said second electronic device is used for Isochronous transactions, passes any data received from said first electronic device directly through to said second electronic device without buffering, and to pass any data received from said second electronic device directly through to said first electronic device without buffering.

8. A bus connection device as claimed in claim 5, wherein said bus connection device, if it is determined that said second electronic device is a USB peripheral device and an endpoint in said second electronic device is used for Bulk transactions, stores each packet of data received from said first electronic device in a FIFO, and to pass said packet of data through to said second electronic device before receipt of a further packet of data, and to store each packet of data received from said second electronic device in a FIFO, and to pass said packet of data through to said first electronic device before receipt of a further packet of data.

9. A bus connection device as claimed in claim 1, wherein, when the bus connection device is operating to allow the first electronic device to act as a host device, said bus connection device sends tokens to the first electronic device, to which the first electronic device can respond by transmitting data intended for the second electronic device, and sends tokens to the second electronic device, to which the second electronic device can respond by transmitting data intended for the first electronic device, according to a predetermined schedule.

10. A bus connection device as claimed in claim 1, wherein the bus connection device provides connection to a first electronic device by means of USB D+/D− lines, and wherein the bus connection device receives data and control information over said USB D+/D− lines.

11. A bus connection device as claimed in claim 10, wherein the bus connection device sends tokens to the first electronic device and to the second electronic device, and to receive control information from the first electronic device, according to a predetermined schedule.

12. A bus connection device as claimed in claim 1, wherein, when the first electronic device or the second electronic device responds to one of said tokens by transmitting data, the bus connection device passes said data through to the second electronic device or to the first electronic device on a packet-by-packet basis.

13. A bus connection device as claimed in claim 1, wherein the bus connection device receives first control information from the first electronic device for the bus connection device itself, and receives second control information from the first electronic device for the second electronic device, and passes said second control information to the second electronic device.

14. A bus connection device as claimed in claim 13, wherein the bus connection device sends a vendor specific command, relating to the second electronic device, to the first electronic device, and receives the second control information from the first electronic device for the second electronic device on the basis of said vendor specific command.

15. A method of operation of a bus connection device, the bus connection device being connected to a first electronic device, and having a second electronic device connected thereto,
wherein the bus connection device determines whether the second electronic device is a host device or a peripheral device and, if the second electronic device is a host device, it is connected directly to the first electronic device whereas, if the second electronic device is a peripheral device, the bus connection device operates to allow the first electronic device to operate as a host device,
wherein, when the bus connection device is operating to allow the first electronic device to act as a host device, said bus connection device regularly sends tokens to the first electronic device and to the second electronic device, to which the first electronic device can respond by transmitting data intended for the second electronic device, and to which the second electronic device can respond by transmitting data intended for the first electronic device.

16. A method as claimed in claim 15, wherein the bus connection device determines whether the second connected device is a USB host device or a USB peripheral device and, if the second electronic device is a USB host device, it is connected directly to the first electronic device whereas, if the second electronic device is a USB peripheral device, the bus connection device operates to allow the first electronic device to operate as a USB host device.

17. A method as claimed in claim 16, wherein the bus connection device comprises a USB mini-AB socket, and wherein the bus connection device determines whether the second connected device is a USB host device or a USB peripheral device on the basis of a type of plug inserted into the mini-AB socket.

18. A method as claimed in claim 16, wherein both the USB host device and the USB peripheral device initiate Bulk, Interrupt, and Isochronous transactions.

19. A method as claimed in claim 16, wherein, if the second electronic device is a USB peripheral device, the bus connection device determines if an endpoint in the second electronic device is used for Bulk or Isochronous transactions.

20. A method as claimed in claim 19, wherein, if the second electronic device is a USB peripheral device, and the endpoint in the second electronic device is used for Isochronous transactions, then, when said bus connection device sends tokens to the first electronic device or to the second electronic device, to which said first electronic device or said second electronic device can respond by transmitting data, said bus connection device also sends tokens to the second electronic device or to the first electronic device, to indicate to said second electronic device or said first electronic device that it may receive transmitted data.

21. A method as claimed in claim 19, wherein, if it is determined that said second electronic device is a USB peripheral device and an endpoint in said second electronic device is used for Isochronous transactions, said bus connection device passes any data received from said first electronic device directly through to said second electronic device without buffering, and passes any data received from said second electronic device directly through to said first electronic device without buffering.

22. A method as claimed in claim 19, wherein, if it is determined that said second electronic device is a USB peripheral device and an endpoint in said second electronic device is used for Bulk transactions, said bus connection device stores each packet of data received from said first electronic device in a FIIFO, and passes said packet of data through to said second electronic device before receipt of a further packet of data, and stores each packet of data received from said second electronic device in a FIFO, and passes said packet of data through to said first electronic device before receipt of a further packet of data.

23. A method as claimed in claim 15, wherein, when the bus connection device is operating to allow the first electronic device to act as a host device, said bus connection device sends tokens to the first electronic device, to which the first electronic device can respond by transmitting data intended for the second electronic device, and sends tokens to the second electronic device, to which the second electronic device can respond by transmitting data intended for the first electronic device, according to a predetermined schedule.

24. A method as claimed in claim 15, wherein the bus connection device provides connection to a first electronic device by means of USB D+/D− lines, and wherein the bus connection device receives data and control information over said USB D+/D− lines.

25. A method as claimed in claim 24, wherein the bus connection device sends tokens to the first electronic device and to the second electronic device, and receives control information from the first electronic device, according to a predetermined schedule.

26. A method as claimed in claim 15, wherein, when the first electronic device or the second electronic device responds to one of said tokens by transmitting data, the bus connection device passes said data through to the second electronic device or to the first electronic device on a packet-by-packet basis.

27. A method as claimed in claim 15, wherein the bus connection device receives first control information from the first electronic device for the bus connection device itself, and receives second control information from the first electronic device for the second electronic device, and passes said second control information to the second electronic device.

28. A method as claimed in claim 27, wherein the bus connection device sends a vendor specific command, relating to the second electronic device, to the first electronic device, and receives the second control information from the first electronic device for the second electronic device on the basis of said vendor specific command.

* * * * *